United States Patent [19]

Sugiyama

[11] Patent Number: 4,543,817

[45] Date of Patent: Oct. 1, 1985

[54] METHOD OF DETECTING A LEAKAGE OF FLUID

[75] Inventor: Sakae Sugiyama, Ibaraki, Japan

[73] Assignee: Hitachi, Ltd., Tokyo, Japan

[21] Appl. No.: 480,787

[22] Filed: Mar. 31, 1983

[30] Foreign Application Priority Data

Mar. 31, 1982 [JP] Japan ................................. 57-50998

[51] Int. Cl.$^4$ ............................................. G01M 3/24
[52] U.S. Cl. .............................. 73/40.5 A; 73/861.18
[58] Field of Search ............... 73/40.5 A, 40.5 R, 592, 73/861.18

[56] References Cited

U.S. PATENT DOCUMENTS

| | | | |
|---|---|---|---|
| 3,021,708 | 2/1962 | November et al. | 73/861.18 |
| 3,930,556 | 1/1976 | Kusuda et al. | 73/40.5 A |
| 3,952,759 | 4/1976 | Ottenstein | 73/40.5 R |
| 3,958,458 | 5/1976 | Foreman et al. | 73/861.18 |
| 4,066,095 | 1/1978 | Massa | 73/40.5 A |
| 4,144,743 | 3/1979 | Covington et al. | 73/40.5 R |
| 4,289,019 | 9/1981 | Claytor | 73/40.5 A |
| 4,327,576 | 5/1982 | Dickey et al. | 73/40.5 A |

FOREIGN PATENT DOCUMENTS

| | | | |
|---|---|---|---|
| 89019 | 8/1978 | Japan | 73/592 |
| 136416 | 10/1979 | Japan | 73/40.5 A |
| 87022 | 7/1980 | Japan | 73/40.5 A |
| 8001943 | 9/1980 | World Int. Prop. O. | 73/40.5 A |

*Primary Examiner*—Gerald Goldberg
*Assistant Examiner*—Hezron Williams
*Attorney, Agent, or Firm*—Antonelli, Terry & Wands

[57] ABSTRACT

A method of detecting a leakage of fluid is disclosed, in which a leaking sound, which is produced when the pipe is broken and propagates through the pipe, is detected by a couple of acoustic sensors mounted to a pipe through which fluid flows at portions separated from each other with a proper distance, the amplitudes of a plurality of different frequency components extracted from the output signals of the acoustic sensors are obtained and then a leaking location of fluid in the pipe and a leaking amount of fluid are determined on the basis of these amplitudes.

8 Claims, 6 Drawing Figures

METHOD OF DETECTING A LEAKAGE OF FLUID

The present invention relates to a method of detecting a leakage of fluid and, more particularly, to a method of detecting a leakage of fluid by the use of acoustic sensors.

In a nuclear power plant, a chemical plant, and the like, it is of very importance to prevent at an early stage an accident of fluid leakage in the piping system which is caused by a breakdown or crack of the pipe or the related equipment. If a fluid leaking accident occurs, it is required to immediately find the location of fluid leakage and an amount of the leaked fluid in order to ensure safety.

There have been proposed various types of methods of detecting the fluid leakage. A typical example of these methods measures a sound generated when the fluid leaks. For measuring the sound, piezoelectric elements are used as acoustic sensors. A location of the fluid leakage out of a pipe is evaluated on the basis of the times taken for the sound to reach the acoustic sensors mounted to both ends of the pipe, for example. When the sound simultaneously reaches the acoustic sensors, it is judged that the fluid leaks at the center of the pipe. In this system, however, when a fluid leakage detecting system fails to detect a leading point, representative of the start of the fluid leakage, of the sound signals produced from the acoustic sensors, it is difficult to find the location of the fluid leakage.

Accordingly, an object of the present invention is to provide a method of reliably detecting a leaking location of fluid using the output signals from the acoustic sensors at a proper time point after the start of the leakage.

In the present invention, the amplitudes of a plurality of different frequency components extracted from a leaking sound detected by a plurality of acoustic sensors mounted to spaced positions on a pipe are obtained and then a leaking location of fluid on the pipe is found on the basis of the amplitudes.

The present invention will be well understood from the following description of embodiments of the invention with reference to the accompanying drawings in which:

FIG. 1a and 1b schematically illustrate a principle of detecting a leakage of fluid according to the present invention;

A principle of detecting a leakage of fluid according to the present invention will be described.

Acoustic sensors A and B are separately mounted to one end portion of a pipe C through which fluid flows. Assume now that the pipe C is broken at a location D and the fluid leaks therefrom. In most cases, a sound or acoustic wave generated when fluid leaks includes various frequency components exhibiting a continuous spectrum and it is seldom that it includes only a single frequency component. Distances from a point E of one of the ends of the pipe C to a leaking location D and to acoustic sensors A and B are $X_1$, $X_2$ and $X_3$, respectively. The acoustic wave of a frequency $f_1$ has amplitudes $S_{11}$ and $S_{12}$ (logarithmic values) at the locations where the acoustic sensors A and B are positioned. An acoustic wave of a frequency $f_2$ has amplitudes $S_{21}$ and $S_{22}$ (logarithmic values) at the same locations. The amplitudes (logarithmic values) $S_1$ and $S_2$ of the acoustic wave of the frequency $f_1$ at the leaking location D spaced the distance X from the point E can be obtained using the distances $X_1$ and $X_2$ and the amplitudes $S_{11}$, $S_{12}$, $S_{21}$ and $S_{22}$.

Figure 1A:
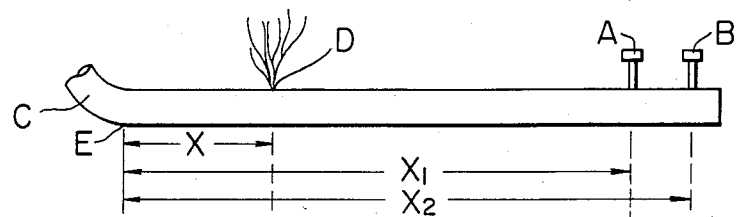
Figure 1B:
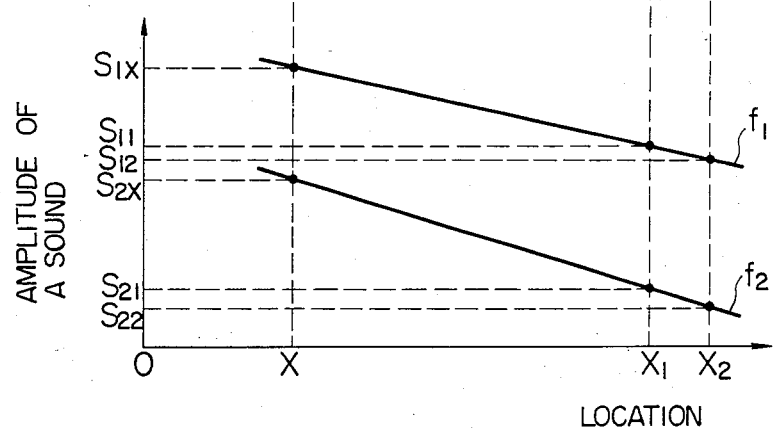

Relationships between the distances X, $X_1$ and $X_2$ and the amplitudes $S_1$, $S_{11}$, $S_{12}$, $S_{2x}$, $S_{21}$ and $S_{22}$ are as illustrated in FIG. 1b. From these relationships, we have the following equations (1) and (2).

$$(S_{1x}-S_{12})/(S_{11}-S_{12})=(X_2-X)/(X_2-X_1) \quad (1)$$

$$(S_{2x}-S_{22})/(S_{21}-S_{22})=(X_2-X)/(X_2-X_1) \quad (2)$$

Three unknown quantities are contained in the above equations (1) and (2). By introducing an equation (3) into the above equations, the unknown quantities $S_{2x}$ and X are expressed by equations (4) and (5).

$$S_{1x}/S_{2x}=k \text{ (constant)} \quad (3)$$

$$S_{2x}=(S_{12}-\alpha S_{22})/(k-\alpha) \quad (4)$$

$$X=X_2-\beta(X_2-X_1)/\gamma \quad (5)$$

where $\alpha$, $\beta$ and $\gamma$ are given by the following equations (6) to (8).

$$\alpha=(S_{11}-S_{12})/(S_{21}-S_{22}) \quad (6)$$

$$\beta=S_{12}-kS_{22} \quad (7)$$

$$\gamma=(S_{21}-S_{22})(k-\alpha) \quad (8)$$

where k is a constant experimentally determined. The relationship between an amount of the fluid leakage Q and the amplitude $S_{1x}$ or $S_{2x}$ of the given frequency component detected at the leaking location D is given by a known function $Q=F(S_{1x})$ or $Q=F(S_{2x})$.

In this way, the unknown quantities X, $S_{1x}$ and $S_{2x}$ are obtained. With denotation of $\rho$ for an attenuation factor of a fluid leaking sound when propagating through the pipe C, equations (9) and (10) hold $$S_{1x}-\rho_1(X_1-X)=S_{11} \quad (9)$$

$$S_{2x}-\rho_2(X_1-X)=S_{21} \quad (10)$$

where
$\rho_1$: Attenuation factor for the frequency $f_1$
$\rho_2$: Attenuation factor for the frequnecy $f_2$.
Therefore, from the equations (9) and (10), the unknown quantities $S_{2x}$ and X are given $$S_{2x}=(S_{11}-\rho_1 S_{21}/\rho_2)/(k-\rho_1/\rho_2) \quad (11)$$

$$X=X_1+(kS_{21}-S_{11})/\{\rho_2(k-\rho_1/\rho_2)\} \quad (12)$$

In this way, the leaking location D and the leaking amount Q of the fluid are obtained.

Figure 2:
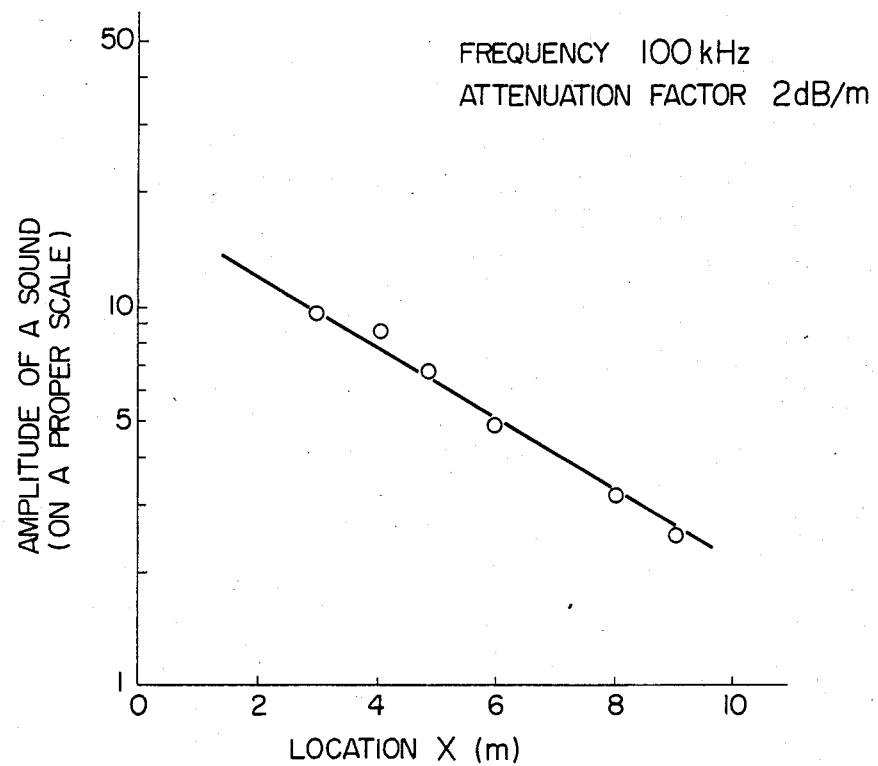
FIG. 2 shows a graph illustrating a relationship of leaking locations vs. the amplitudes of a leaking sound.

The relationship between leaking location X in FIG. 1b and an amplitude S of 100 KHz frequency component in the leaking sound, which were actually measured of a steel pipe, is shown by a graph of FIG. 2.

Figure 3:
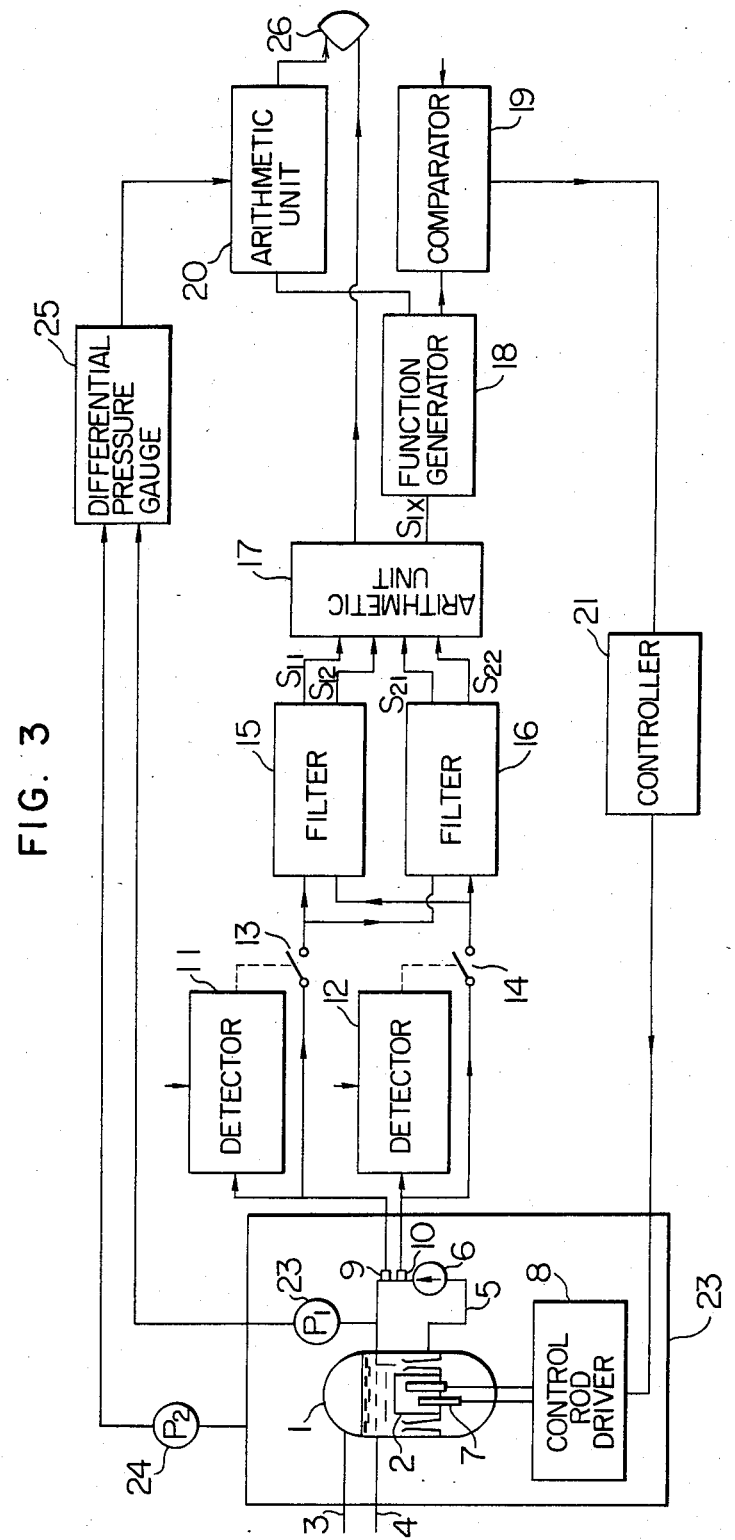
FIG. 3 shows a block diagram of an apparatus for detecting the fluid leakage according to the method of the present invention.

A method of detecting a leakage of fluid based on the above principle will be described with respect to an embodiment applied to a boiling-water nuclear power generating plant as shown in FIG. 3. In the power generating plant, cooling water is evaporated in a reactor core 2 of a reactor pressure vessel 1. The vapor is discharged from the reactor pressure vessel 1 to a main steam pipe 3 and then is led to a turbine (not shown). The vapor discharged from the turbine is condensed into water, i.e. cooling water, in a condenser (not shown). The cooling water is returned through a water feed pipe 4 to the reactor pressure vessel 1. The cooling water therein is led to the reactor core 2 via a recirculating system. The recirculating system is comprised of a recirculating pipe 5 connected to the reactor pressure vessel 1 and a recirculating pump 6 provided in the recirculating pipe 5. A control rod 7 for controlling a reactor output power is inserted into the reactor core 2. The control rod 7 is coupled with a control rod driver 8.

The sensors 9 and 10 are mounted to the recirculating pipe 5 downstream of the recirculating pump 6 and slightly separated from the recirculating pipe 5. The acoustic sensors 9 and 10 detect a leaking sound which is generated due to the breakage of the pipe and propagates through the pipe. The output signals from the acoustic sensors 9 and 10 are applied to amplitude detectors 11 and 12. Each detector detects an amplitude of the signal output from the corresponding sensor and compares it, by a comparator contained therein, with a predetermined value corresponding to the amplitude of a leaking sound produced when the breakage of the pipe is minimum. When the amplitude of the output signal from the acoustic sensor exceeds the predetermined value, it is judged that the fluid leakage takes place in the recirculating pipe 5. When the amplitude detectors 11 and 12 judge that the amplitudes of the output signals from the acoustic sensors are larger than the respective predetermined values, the amplitude detector 11 produces a signal for closing a switch 13 and the amplitude detector 12 produces a signal for closing a switch 14. Upon receipt of these signals, the switches 11 and 12 are closed. So long as the signals are not produced from the amplitude detectors 11 and 12, respectively, the switches 13 and 14 are in an open state. As the result of closing the switches 13 and 14, the output signals from the sensors 9 and 10 are applied to bandpass filters 15 and 16, respectively. The band-pass filter 15 includes separate filter units for producing output signals representative of the amplitudes $S_{11}$ and $S_{12}$, respectively, of the frequency component $f_1$ in the respective signals from the sensors 9 and 10. The bandpass filter 16 likewise produces output signals representative of the amplitudes of the frequency component $f_2$ in the signals from the sensors. The amplitude signals $S_{11}$, $S_{12}$, $S_{21}$ and $S_{22}$ from the band-pass filters are applied to an arithmetic unit 17. Upon receipt of these signals, the arithmetic unit 17 calculates the amplitudes $S_{1x}$ and $S_{2x}$ and the distance X from the reference position E to the leak position D according to the equations (9), (11) and (12). The attenuation factors $\rho_1$ and $\rho_2$ are dependent on the material and shape of the pipe. Accordingly, the attenuation factors $\rho_1$ and $\rho_2$ can previously be determined by an experimental study using a scale-down model of the pipe system actually used in nuclear power plant. The attenuation factors thus obtained are stored in a memory of the arithmetic unit 17.

Figure 4:
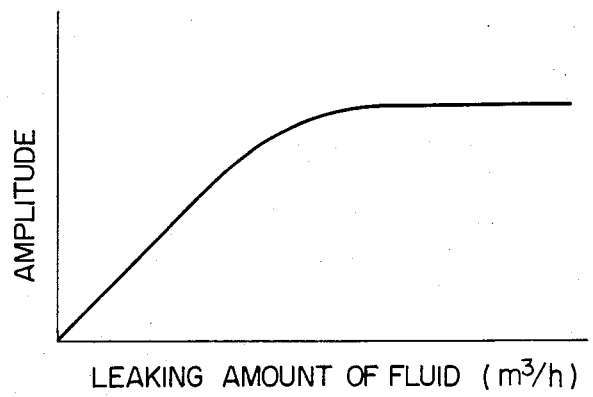
FIG. 4 shows a graph illustrating a relationship between a leaking amount of fluid and an amplitude of the leaking sound.

The arithmetic unit 17 produces signals representing the amplitude $S_{1x}$ and the distance X. The signal of the amplitude $S_{1x}$ is applied to a function generator 18. The function generator 18 produces an amount of the fluid leakage Q corresponding to the amplitude $S_{1x}$ applied thereto according to a relationship between them as shown in FIG. 4. The amount of the fluid leakage Q is applied to a comparator 19 and an operation unit 20. The comparator 19 compares the amount of the fluid leakage Q with its set value. When the amount of the fluid leakage Q is larger than the set value, the cooling water in the reactor pressure vessel 1 of the nuclear reactor is possibly being subjected to rapid reduction, thereby lowering the level of the cooling water, resulting in the fuel assembly becoming exposed, and the boiling-water nuclear reactor being in a dangerous state. Accordingly, when the amount of the fluid leakage Q exceeds the set value, the comparator 19 produces a scram signal which is supplied to a controller 21. Under control of the scram signal, the controller 21 drives the control rod driver 8 to rapidly insert the control rod 7 into the reactor core 2 so as to scram the nuclear reactor.

Figure 5:
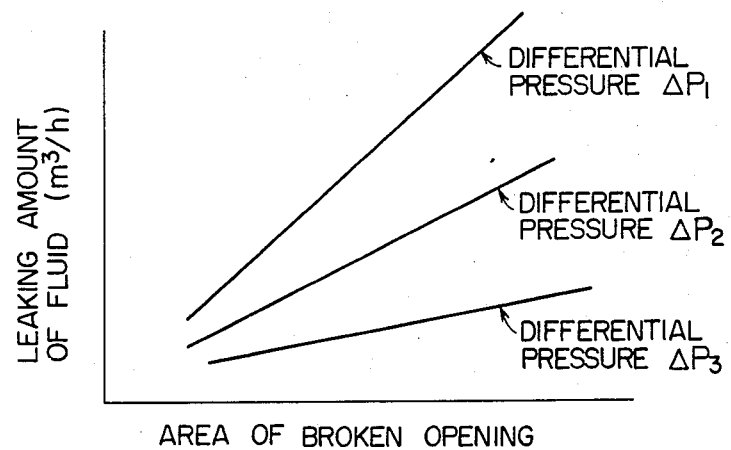
FIG. 5 shows a graph illustrating relationships between an area of a cracked or broken opening and an leaking amount of fluid.

The arithmetic unit 20, when receiving the amount of the fluid leakage Q, operates to calculate an opening area of a broken part of the pipe, as a function of a differential pressure to be described later. For measuring the differential pressure, a pressure gauge 22, a pressure gauge 24 and a differential pressure gauge 25 are provided. The pressure gauge 22 measures an internal pressure $P_1$ of the recirculating pipe 5. The pressure gauge 24 measures an internal pressure $P_2$ in the nuclear reactor container 23 enclosing the reactor pressure vessel 1 containing the recirculating pipe 5. The differential pressure is obtained by the differential pressure gauge 25, as a difference between $P_1$ and $P_2$ and applied to an arithmetic unit 20. Upon receipt of the amount of the fluid leakage Q and the differential pressure, the arithmetic unit 20 calculates an opening area of the broken part of the pipe, according to the relationship as shown in FIG. 5.

The distance X and the opening area produced from the arithmetic units 17 and 20 are displayed by a display 26.

As described above, the embodiment obtains a fluid leaking location, using the amplitude information for two frequency components of the leaking sound received by two acoustic sensors separately mounted to the pipe at proper different locations of the pipe. Further, it obtains the amount of the fluid leakage using the amplitude information for the two frequency components and the amplitude information at the leaking locations. Further, the opening area of the broken part of the pipe may be obtained. It is noted that even when failing to catch the output signal representative of a fluid leakage start point from the sensor, the leak location, the amount of the leaking fluid, and the opening area of the broken part of the pipe can reliably be obtained using a stationary fluid leaking sound after the fluid leaks. Further, the present embodiment can detect a leakage of fluid occuring in the pipe at a portion between the acoustic sensors or at other portions. This feature remarkably reduces the number of the acoustic sensors to be mounted to the pipe.

It is evident that the present invention is applicable to any suitable plants other than the nuclear power plant.

Additionally, the present invention can reliably detect the leaking location of the pipe even when the fluid leak detecting system fails to catch the leading point of the leak sound produced at the start of the fluid leak.

What is claimed is:

1. A method of detecting a leakage of fluid comprising the steps of:

detecting a leaking sound of fluid by a plurality of acoustic sensors separately mounted to a pipe through which fluid flows;

obtaining amplitudes of a plurality of different frequency components extracted from the output signals from said acoustic sensors;

determining a leaking location of fluid of said pipe on the basis of said amplitudes;

determining an amount of leaking fluid on the basis of said amplitudes; and determining an opening area of a broken part of said pipe on the basis of a differential pressure between a first pressure in said pipe and a second pressure outside said pipe, and the amount of the leaking fluid.

2. A method of detecting a leakage of fluid according to claim 1, wherein said pipe is disposed in a plant, and further comprising the step of stopping the operation of said plant when said amount of leaking fluid exceeds a set value.

3. A method of detecting a leakage of fluid according to claim 1, wherein said pipe is disposed in a nuclear reactor plant, and further comprising the step of scraming said nuclear reactor plant when said amount of leaking fluid exceeds a set value.

4. A method of detecting a leakage of fluid comprising the steps of:

detecting a leaking sound of fluid at a plurality of acoustic sensors separately mounted to a pipe through which liquid flows;

obtaining amplitudes of a plurality of different frequency components extracted from the output signals from the acoustic sensors;

determining an amount of leaking fluid on the basis of the amplitudes; and determining an opening area of a broken part of the pipe on the basis of a differential pressure between a first pressure in the pipe and a second pressure outside the pipe, and the amount of the leaking fluid.

5. A method of detecting a leakage of fluid according to claim 4, further comprising the steps of measuring the first pressure in the pipe, measuring a second pressure outside the pipe, and forming the differential pressure between the first pressure and the second pressure.

6. A method of detecting a leakage of fluid according to claim 4, wherein the pipe is disposed in a plant, and further comprising the step of stopping the operation of the plant when the amount of leaking fluid exceeds a set value.

7. A method of detecting a leakage fluid according to claim 4, wherein the pipe is disposed in a nuclear reactor plant, and further comprising the step of scraming the nuclear reactor plant when the amount of leaking fluid exceeds the set value.

8. A method of detecting a leakage fluid according to claim 4, further comprising the step of determining a leaking location of fluid of the pipe on the basis of the amplitudes.

* * * * *